United States Patent [19]
Van Dine et al.

[11] Patent Number: 6,072,252
[45] Date of Patent: *Jun. 6, 2000

[54] COMPOSITE ELECTRIC MOTOR SHAFT

[75] Inventors: Piet Van Dine, Stonington, Conn.; Vladimir Odessky, North Brunswick, N.J.; Brian E. Spencer, Lincoln, Nebr.; James S. Smith, Old Lyme; William R. Harring, Oakdale, both of Conn.

[73] Assignee: Electric Boat Corporation, Groton, Conn.

[*] Notice: This patent issued on a continued prosecution application filed under 37 CFR 1.53(d), and is subject to the twenty year patent term provisions of 35 U.S.C. 154(a)(2).

[21] Appl. No.: 08/832,306

[22] Filed: Apr. 3, 1997

[51] Int. Cl.⁷ .............................. H02K 5/16; H02K 15/02
[52] U.S. Cl. .......................... 310/43; 310/271; 310/261; 310/75 D; 464/181; 464/183; 464/903
[58] Field of Search .............................. 310/43, 271, 261, 310/263, 75 D, 51; 464/179, 181, 182, 183, 902, 903, 88, 93, 140, 147

[56] References Cited

U.S. PATENT DOCUMENTS

| | | | |
|---|---|---|---|
| 451,872 | 5/1891 | Boiteaux | 310/261 |
| 775,884 | 11/1904 | Backstrom | 464/182 |
| 2,680,822 | 6/1954 | Brainard | 310/261 |
| 3,242,998 | 3/1966 | Gubbins | 173/163 |
| 3,349,478 | 10/1967 | De Jean | 29/598 |
| 3,553,511 | 1/1971 | Hemmings et al. | 310/156 |
| 3,571,639 | 3/1971 | Tiltins | 310/168 |
| 3,592,884 | 7/1971 | Williams | 464/181 |
| 3,599,024 | 8/1971 | Kitamura | 310/263 |
| 3,623,220 | 11/1971 | Chase et al. | 29/598 |
| 3,678,313 | 7/1972 | Parker | 310/236 |
| 4,028,573 | 6/1977 | Terrone | 310/217 |
| 4,433,261 | 2/1984 | Nashiki et al. | 310/156 |
| 4,484,094 | 11/1984 | Ade et al. | 310/43 |
| 4,633,113 | 12/1986 | Patel | 310/156 |
| 4,661,183 | 4/1987 | Beard | 156/172 |
| 4,674,178 | 6/1987 | Patel | 29/598 |
| 4,729,160 | 3/1988 | Brown | 29/598 |
| 4,930,201 | 6/1990 | Brown | 29/598 |
| 4,930,210 | 6/1990 | Wag | 29/597 |
| 5,296,773 | 3/1994 | El-Antably et al. | 310/261 |
| 5,349,259 | 9/1994 | Kanoko et al. | |
| 5,769,618 | 6/1998 | Ono et al. | 418/48 |
| 5,789,832 | 8/1998 | Hwang | 310/43 |

*Primary Examiner*—Nestor Ramirez
*Assistant Examiner*—Karl Eizo Tamai
*Attorney, Agent, or Firm*—BakerBotts, LLP

[57] ABSTRACT

A composite electric motor shaft including axially distributed metallic and nonmetallic sections joined together exhibit increased mechanical damping, increased rotor critical speed, improved corrosion resistance and improved motor performance.

4 Claims, 5 Drawing Sheets

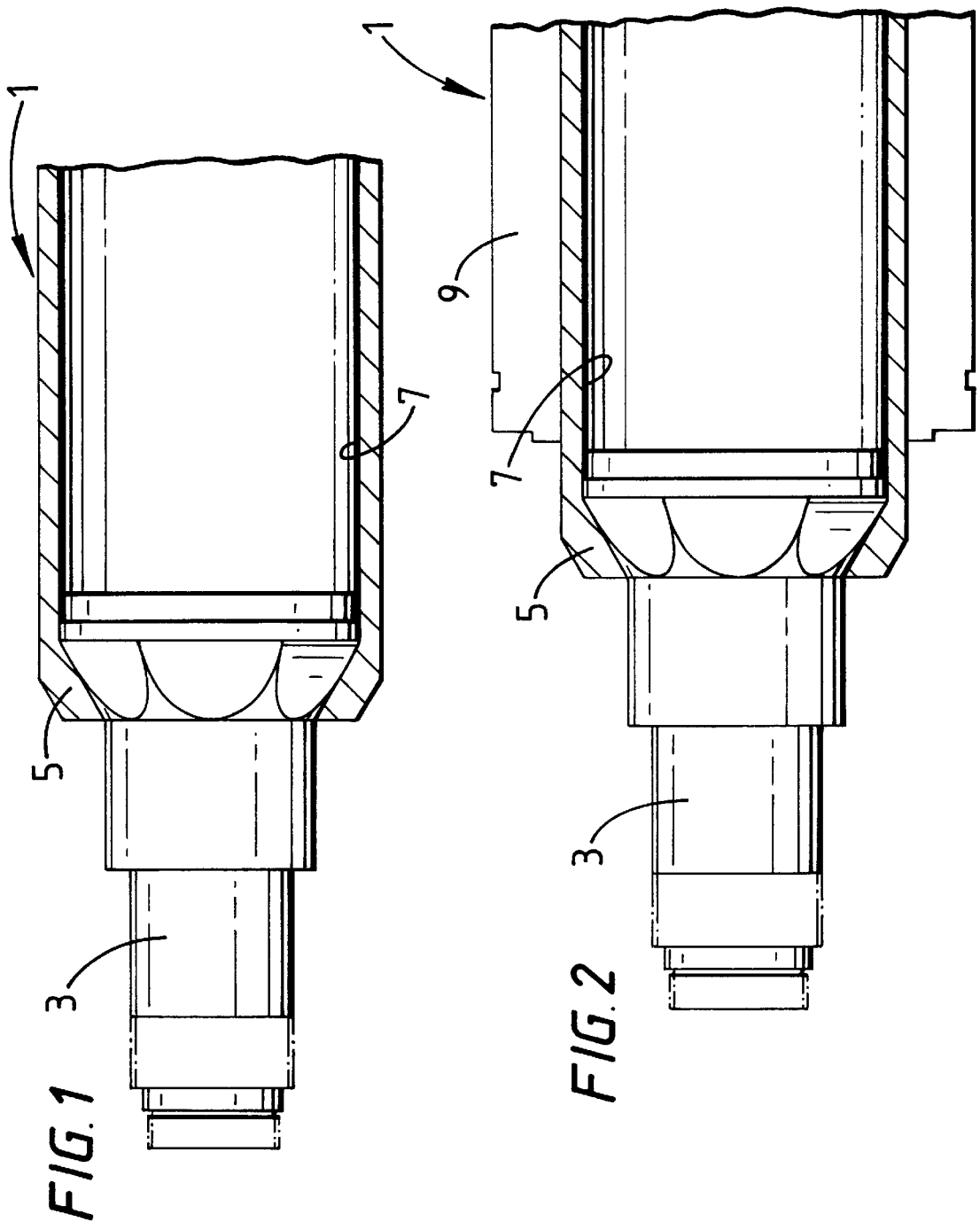

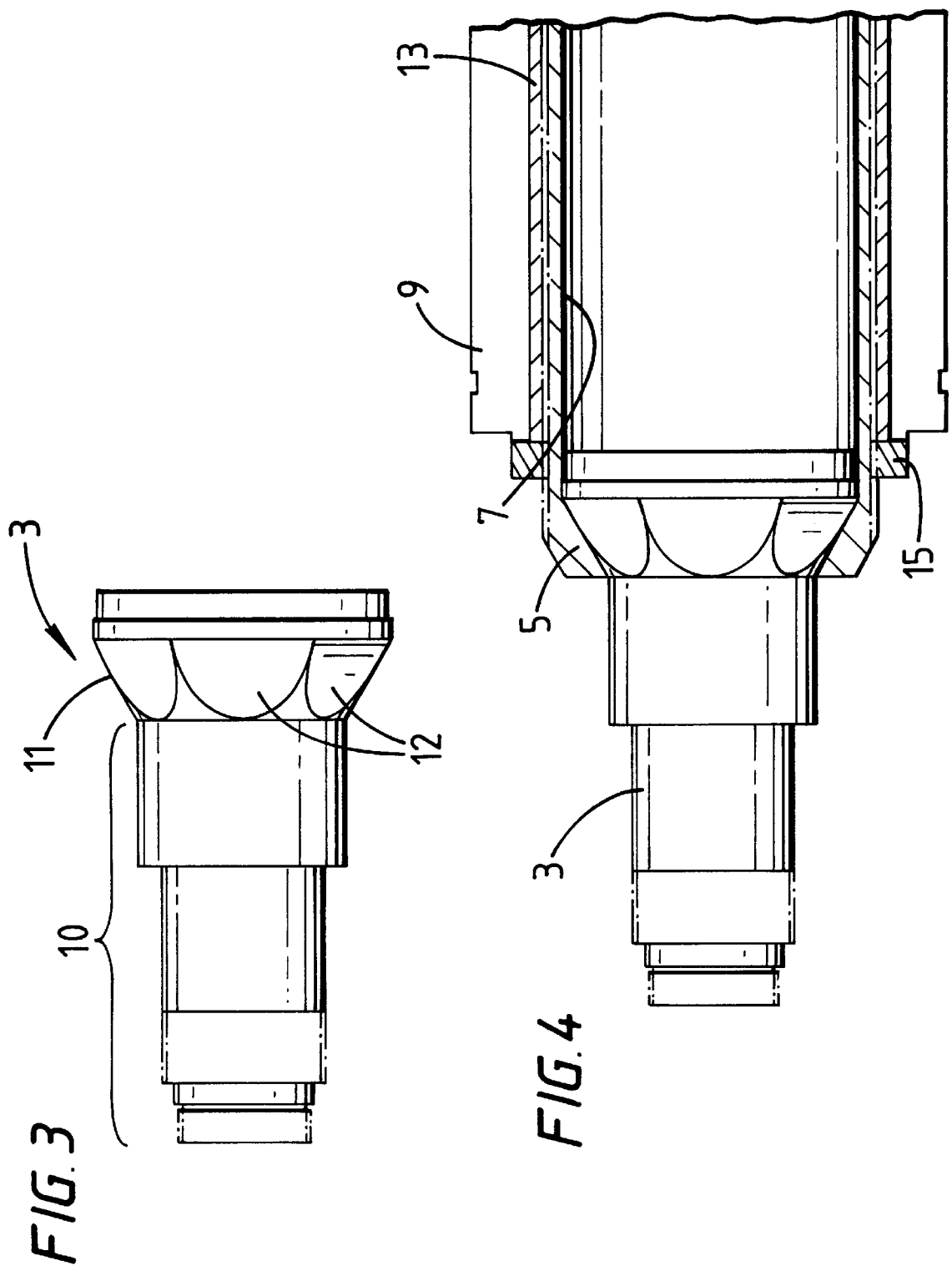

COMPOSITE ELECTRIC MOTOR SHAFT

BACKGROUND OF THE INVENTION

This invention relates to a composite multi-section electric motor shaft having integral metallic and non-metallic sections. The multi-section motor shaft has reduced weight and rotational inertia and provides improved mechanical damping, higher critical speed, improved corrosion resistance and improved motor performance. This invention also relates to a motor shaft having a removable rotor. By making the rotor separable from the shaft, repair and replacement of the rotor is facilitated.

Conventional electric motor shafts are typically fabricated from metal and may include integrally formed rotors. Alternatively, the rotors are separately formed and not integral with the motor shaft. The rotors may include laminations, conductors, permanent magnets, etc. which constitute the rotating electromagnetic portion of the motor. Typically the materials used in motor shafts include steel or corrosion-resistant alloys. The damping properties, weight and other characteristics of the motor shaft are a function of the materials used for shaft construction.

SUMMARY OF THE INVENTION

Accordingly, it is an object of the invention to provide an electric motor shaft which has reduced weight and rotational inertia.

It is also an object of the invention to provide an electric motor shaft which absorbs or dampens vibration.

Another object of the invention to provide an electric motor shaft which exhibits higher critical speed, improved corrosion resistance and improved rotor performance.

A further object of the invention is to provide a motor shaft with a separable rotor to facilitate rotor replacement and repair.

These and other objects of the invention are attained by providing an electric motor shaft including a plurality of axially distributed sections and including at least one metallic section and at least one nonmetallic section. The nonmetallic sections are formed composite materials.

BRIEF DESCRIPTION OF THE DRAWINGS

Further objects and advantages of the present invention will be more fully appreciated from a reading of the detailed description when considered with the accompanying drawings wherein:

FIG. 1 is a side view partly in section, of an electric motor shaft in accordance with the invention wherein the composite body is shown in cross section to illustrate the arrangement of the metallic and non-metallic portions.

FIG. 2 is a side view, partly in section, of an electric motor shaft as in FIG. 1 having composite ribs in accordance with the invention;

FIG. 3 is a side view of a metal end section of an electric motor shaft in accordance with the invention;

FIG. 4 is a side view, partly in section, of an electric motor shaft as in FIG. 1 having a removable sleeve with ribs in accordance with the invention;

DESCRIPTION OF THE PREFERRED EMBODIMENTS

Figure 5C:
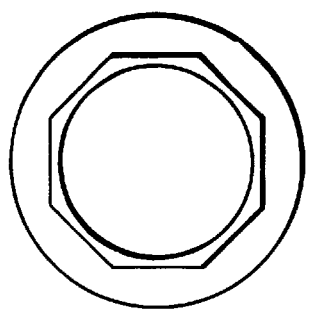
FIGS. 5(a)–5(c) are longitudinal sectional views and opposite end views, respectively of the shaft radial guide bearing sleeve in accordance with the invention.

The electric motor shaft in accordance with the invention includes both metallic and nonmetallic sections. The electric motor shaft includes a shaft body section formed of composite material and a metallic shaft end section affixed to one end of the shaft body section. In the representative embodiment illustrated in FIG. 1 the electric motor shaft 1 includes a metal end fitting 3 affixed at a joint 5 to a tubular composite body 7. The electric motor shaft is assembled by pressing the metal fitting 3 against one end of a tubular composite body which is held in place with a composite threaded rod inserted through the center of the composite body 7. Alternatively, the composite tubular body may be held in place by inserting the composite body in the cavity of a filament winding machine.

The tubular composite body is molded high strength, high modulus fibers such as fiberglass, graphite, carbon, boron, quartz and aramyde fiber on a composite sleeve which is held against the metal end fitting 3. Preferably the composite tubular body is formed from S glass or carbon fiber. The composite tubular body and the junction between the metal end fitting 3 and tubular composite body is then wrapped in fiber which is pre-impregnated with resin or fiber applied after passing through a resin bath. This fiber wrap produces a bridging tapered portion forming the joint 5 between the metal end piece and the tubular composite body. The fiber wrapped composite body is then cured and machined to size. Preferably the fiber materials used for wrapping are the same fiber materials used in the composite tubular body and include carbon fiber and S glass fiber.

As will be understood by those skilled in the art any suitable adhesive resin may be used depending on the environment of use. For example an epoxy resin is inexpensive and flexible while vinyl ester resins, which are not water soluble, may be preferred in an aqueous environment. Similarly a highly flame retardant resin may be used in a flammable environment.

As shown in FIG. 2, an array of ribs 9 for supporting a rotor can be bonded to the shaft using a suitable epoxy or other adhesive. The ribs can be made of the same composite material as the material of the composite body.

A side view of the metal end fitting 3 is shown in FIG. 3. Typically the metal end fitting includes a stem portion 10 having segments of different diameters and an end 11 which is tapered at an angle of about 30° to the axis of the stem and includes flat facets 12 which engage the composite body 5.

FIG. 4 illustrates an alternate embodiment in which the ribs 9 are made of metal are integral to a composite sleeve 13 which is removably retained on the composite body 7 by metal retaining nuts 15.

Figure 5B:
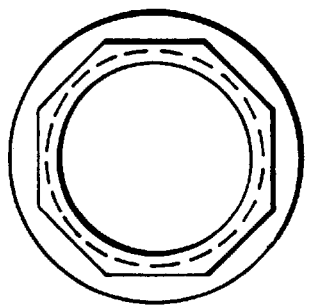
Figure 5A:
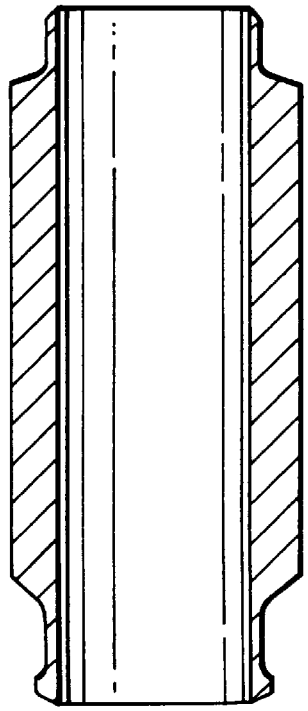

The sleeve 13 may also be made of metal. FIGS. 5(a)–5(c) show a metal sleeve to be mounted on the composite body. As best seen in the end views of FIGS. 5(b) and 5(c) each end of the metal sleeve has flat surfaces which are wrapped with fiber and machine finished.

Figure 6:
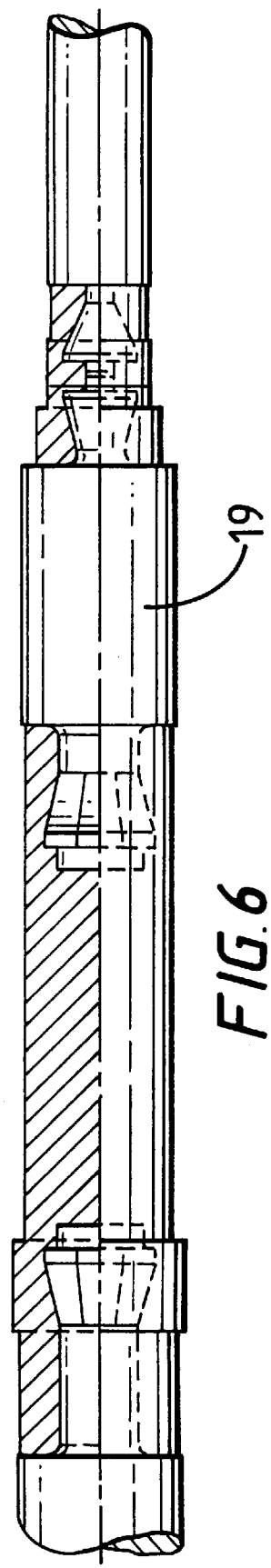
FIG. 6 is a side view, partly in section, of a multi-section shaft in accordance with the invention.

FIG. 6 illustrates another embodiment of the invention in which a multi-section motor shaft includes two nonmetallic shaft sections 17 formed of composite material and a metallic mid-body section 19. The nonmetallic shaft 17 sections help isolate upper and lower motor bearings from the driven component. While a shaft having two nonmetallic sections 17 and one metallic mid-body section 19 is illustrated in FIG. 6, it is clear to one skilled in the art that any arrangement of axially distributed metallic and nonmetallic sections may be provided.

Figure 7:
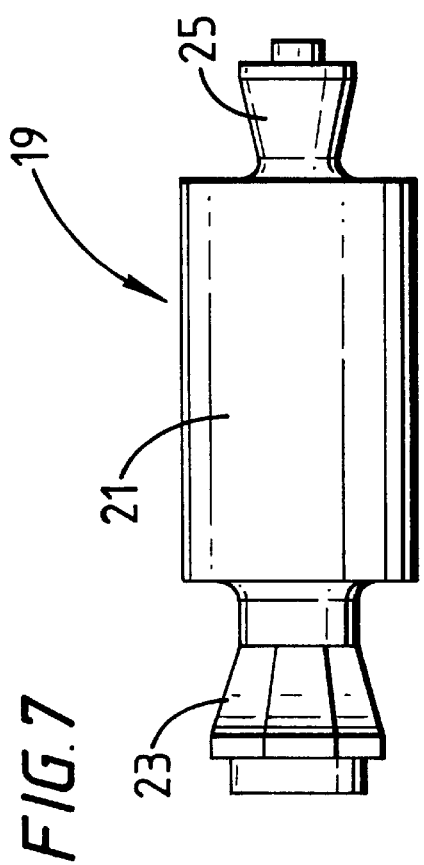
FIG. 7 is a side view of a metallic mid body section of the multi-section shaft shown in FIG. 6.

FIG. 7 illustrates a typical metallic mid-body section 19 of the type shown in FIG. 6 having a cylindrical portion 21 and tapered end portions 23 and 25.

Figure 8:
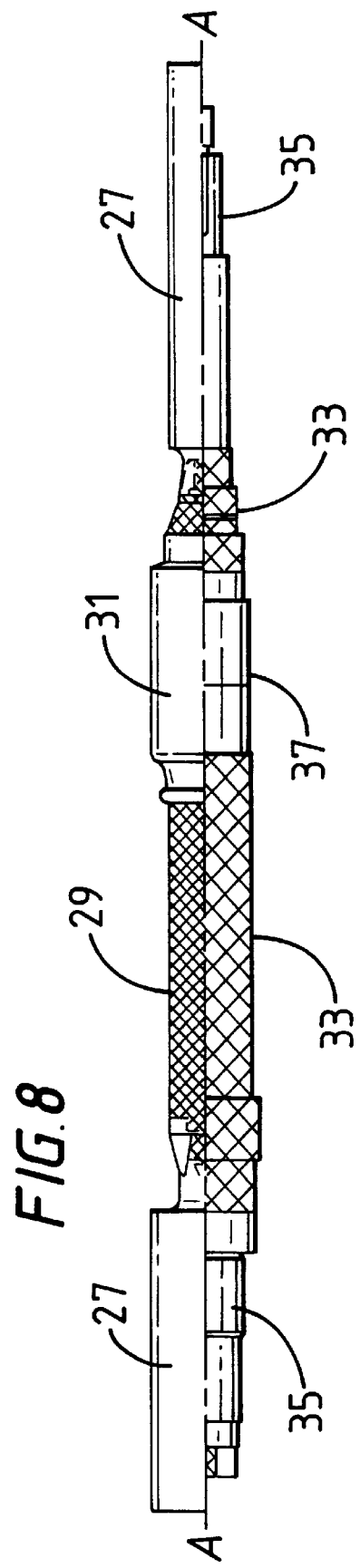
FIG. 8 is a side view, partly in section, of an electric motor shaft in accordance with the invention showing fiber wrapping and finishing.

The several sections of the composite electric motor shaft according to the invention are preferably assembled prior to fiber wrapping. A typical motor shaft prior to fiber wrapping and finishing is shown in FIG. 8. The portion above the line A—A in FIG. 8 illustrates the preassembled shaft components including metal end pieces 27 which are placed in abutment against composite body 29 and a metal sleeve 31 for receiving a rotor mounted on the composite body 29. After assembly of these metal and composite body components the entire shaft is wrapped with fiber in the manner described above and machine finished. The portion below line A—A depicts the motor shaft after fiber wrapping and machine finishing. Portions of the shaft marked in cross hatch 33 indicate fiber wrapped portions. The metal end pieces 35 and sleeve 37 are machined finished to suitable shapes.

Figure 9:
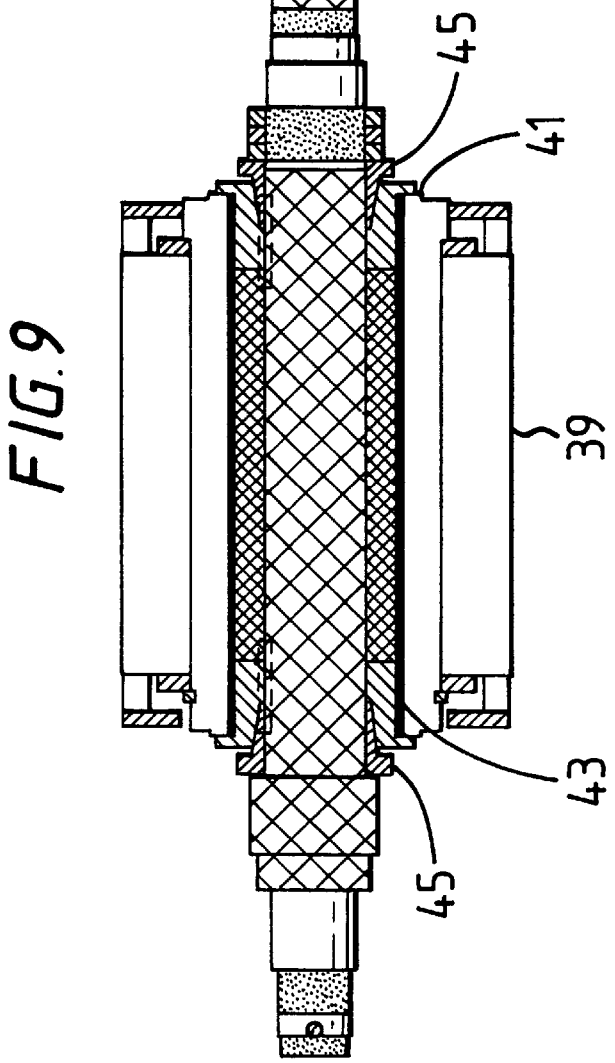
FIG. 9 is a longitudinal sectional view of an electric motor shaft with separable rotor in accordance with the invention.

An assembled motor shaft and rotor in accordance with the invention is shown in FIG. 9. A removable metal rotor 39 is mounted on a metal sleeve 41 having ribs, the metal sleeve being inserted on the composite sleeve 43. Tapered end sleeves formed of metal 45 additionally secures and supports metal sleeve 41.

The nonmetallic sections of the electric motor shaft and rotor described herein provide reduced weight and rotational inertia as compared to shafts constructed entirely of metal. The nonmetallic sections also provide increased damping, thereby increasing overall damping of shaft-borne vibrations. The increased damping is highly desirable as it minimizes the detrimental forces imparted by the motor on the driven component as well as by the driven component on the motor bearings. The use of composite materials alters the inertia and stiffness in the shaft resulting in greater absorption of vibration. As a result of the mechanical properties of the composite material a higher critical motor speed is achievable. In this regard increasing the critical motor speed so as to exceed the start and run frequency range results in less trauma to the motor and a driven component resulting from motor and a driven component natural frequency excitation.

The electric motor shaft according to the invention also exhibits improved corrosion resistance since the nonmetallic sections are inert in most environments whereas metallic shafts made of various steel, nickel or other metals may be subject to corrosion in certain environments.

In addition, the use of multi-section motor shafts as in the claimed invention facilitates fabrication of motor shafts with complex geometries and allows variation of motor shaft damping along the shaft length to further attenuate vibratory energy. By varying thickness and winding geometry the composite body may be used to provide desired shaft strength, stiffness and damping characteristics.

Although the invention has been described herein with respect to specific embodiments, many modifications and variations therein will readily occur to those skilled in the art. Accordingly, all such variations and modifications are included with the intended scope of the invention.

We claim:

1. An electric motor shaft and rotor assembly comprising:

an electric motor shaft including a plurality of alternating axially distributed cross-sectional segments joined together including a body section formed of composite material and metallic end cross-sectional segments affixed to each end of the composite body section, a sleeve formed of composite material on the outer surface of the composite body, longitudinally extending metal ribs mounted on the sleeve, and a rotor removably mounted on the metal ribs.

2. An electric motor shaft and rotor assembly according to claim 1 comprising at least two metallic cross-sectional segments and at least two nonmetallic cross-sectional segments in alternating arrangement in the axial direction of the shaft.

3. An electric motor shaft and rotor assembly according to claim 1, wherein the composite material comprises a material selected from the group consisting of filament wound carbon fiber and glass fibers.

4. An electric motor shaft and rotor assembly according to claim 1 wherein the composite material comprises resin and fiber.

* * * * *

UNITED STATES PATENT AND TRADEMARK OFFICE
CERTIFICATE OF CORRECTION

PATENT NO. : 6,072,252
DATED : June 6, 2000
INVENTOR(S) : Piet Van Dine et al.

It is certified that error appears in the above-identified patent and that said Letters Patent is hereby corrected as shown below:

Title page,
Item [54], Title "COMPOSITE ELECTRIC MOTOR SHAFT" should read -- ELECTRIC MOTOR SHAFT HAVING METALLIC AND NONMETALLIC SECTIONS --.
Item [56], References Cited, U.S. PATENT DOCUMENTS: "4,930,210 6/1990 Wag" should read -- 4,930,210 6/1990 Wang --.
Item [56], References Cited, U.S. PATENT DOCUMENTS: "5,349,259 9/1994 Kanoko et al." should read -- 5,349,259 9/1994 Kaneko et al. --, per IDS 6/25/97.

Column 1,
Line 1, "COMPOSITE ELECTRIC MOTOR SHAFT" should read -- ELECTRIC MOTOR SHAFT HAVING METALLIC AND NONMETALLIC SECTIONS --.

Signed and Sealed this

Twenty-third Day of October, 2001

Attest:

NICHOLAS P. GODICI
*Attesting Officer*     *Acting Director of the United States Patent and Trademark Office*